Nov. 17, 1925.
E. J. NEGY
1,562,245
COMBINED RADIATOR GUARD AND FENDER BRACE
Filed Aug. 16, 1924
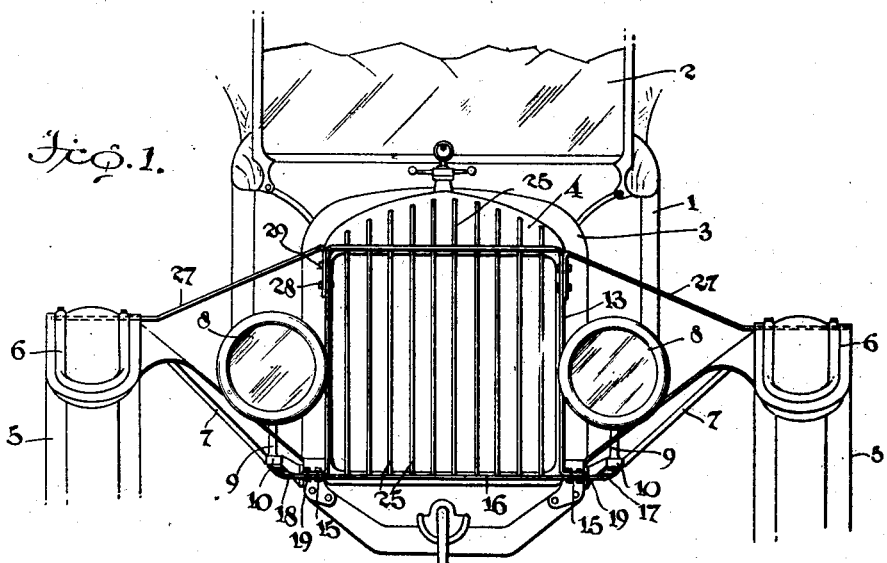
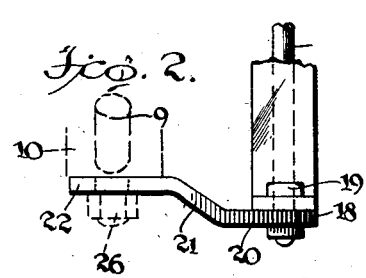
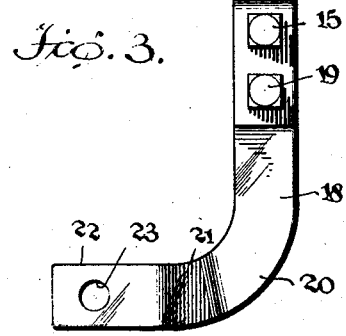
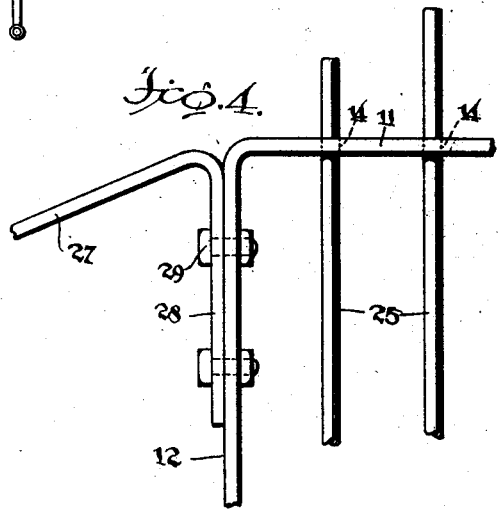
INVENTOR.
E. J. Negy,
BY
Geo. F. Kimmel.
ATTORNEY.

Patented Nov. 17, 1925.

1,562,245

UNITED STATES PATENT OFFICE.

ELMER J. NEGY, OF ABILENE, TEXAS.

COMBINED RADIATOR GUARD AND FENDER BRACE.

Application filed August 16, 1924. Serial No. 732,509.

*To all whom it may concern:*

Be it known that I, ELMER J. NEGY, a citizen of the United States, residing at Abilene, in the county of Taylor and State of Texas, have invented certain new and useful Improvements in Combined Radiator Guards and Fender Braces, of which the following is a specification.

This invention relates to a combined radiator guard and fender brace, and has for its object to provide a device of the class referred to, in a manner as hereinafter set forth for not only bracing the front fenders of a motor vehicle, but further constituting means to protect the radiator of the vehicle in the event of the latter colliding with an obstruction in the path of travel or with a vehicle approaching from the front.

A further object of the invention is to provide, in a manner as hereinafter set forth, a device for the purpose referred to, capable of being secured in protecting and bracing position without any of the weight thereof transmitted to the radiator, and further without any strain on the latter, as well as permitting of the removal of the radiator without disconnecting the device.

Further objects of the invention are to provide, in a manner as hereinafter set forth, a device for the purpose referred to, which is simple in its construction and arrangement, enhancing the appearance at the front end of the vehicle when the device is secured thereto in its protecting and bracing position, strong, durable, thoroughly efficient in its use, conveniently installed, and comparatively inexpensive to manufacture.

With the foregoing and other objects in view the invention consists of the novel construction, combination and arrangement of parts, as hereinafter move specifically described and illustrated in the accompanying drawings, wherein is shown an embodiment of the invention, but it is to be understood that changes, variations and modifications can be had which will fall within the scope of the claims hereunto appended.

In the drawings wherein like reference characters denote corresponding parts throughout the several views thereof:—

Figure 1, is a fragmentary view, in front elevation, of a motor vehicle, showing the adaptation therewith of a combined radiator guard and fender brace in accordance with this invention.

Figure 2, is a fragmentary view, in side elevation, of one of the lower corner portions of the device.

Figure 3, is a fragmentary view, in plan, of one of the lower corner portions of the device.

Figure 4, is a fragmentary view, in front elevation, of one of the upper corners of the device.

Referring to the drawings in detail 1 denotes the body portion of a motor vehicle, 2 the windshield, 3 the engine hood, 4 the radiator, 5 the front wheels, 6 the front fenders, 7 the front fender braces, 8 the headlights, 9 the standards for the headlights, and 10 the supports for the standards 9.

A combined radiator guard and fender brace, in accordance with this invention, comprises an inverted U-shaped frame consisting of a top member 11 and a pair of side members 12, 13. The frame is formed from a flat metallic bar of substantial width, length and thickness. The side members 12, 13 are of greater length than the top member 11. The width of the frame is the same as, but its height is less than, the radiator 4.

The top member 11 is formed with a series of spaced openings 14, and the lower end of each of the side members has an outwardly projected right angularly disposed apertured rectangular flat flange 15. The function of the openings 14 and flanges 15 will presently be referred to.

The inverted U-shaped frame is positioned at the front of the radiator 4 and is mounted upon and secured to a horizontally disposed rearwardly extending yoked-shaped support consisting of an intermediate portion 16 a front or a pair of rearwardly extending arms or end portions 17, 18. The support is formed from a flat metallic bar of substantial width, length and thickness and which is bent to provide the portions 16, 17 and 18, and the width of such bar corresponds to that of the bar from which the U-shaped frame is formed. The width of the support is greater than the width of the U-shaped frame.

The intermediate portion 16, of the support, is of greater length than the width of the inverted U-shaped frame, and the latter has the side members 12, 13 thereof seated on the intermediate portion 16. Each of the flanges 15 is fixedly secured to the portion 16 of the support by the holdfast devices 19.

The end portion 17, as well as end portion 18, of the support consists of a rearwardly curved front part 20, a rearwardly extending and upwardly inclined intermediate part 21 and a rear part 22 extending in the direction of the length of the vehicle body 1. The rear part 22 is apertured, as at 23 and is positioned above the front part 20 through the medium of the inclined intermediate portion 21.

The intermediate portion 16 of the support is formed with a series of openings 24, which align with the openings 14 of the top member 11 of the inverted U-shaped frame. Extending through the openings 14 is a series of vertically disposed and spaced guide rods 25, which have their lower ends positioned within the openings 24, and anchored to the intermediate portion 16 of the support. The rods 25 project above said top member 11 and progressively increase in height from each end of the series towards the center thereof. The rods 25 project from the top member 11 to the top of the radiator 4, so that portion of the latter above the member 11 will be protected or guarded.

The support is fixedly secured in position in a manner so that it does not require the removal or disconnecting thereof when it is desired to remove the radiator 4, and further so that the latter will be free of any of the weight of or any strain from the combined radiator guard and fender brace when mounted in protecting position with respect to the radiator, and for the foregoing purposes the end portions 17 and 18 extend to a position below the supports 10, or in other words when the support for the inverted U-shaped frame is arranged in position the rear parts 22 of the end portions 17, 18 extend directly below the supports 10 and are secured thereto by the holdfast devices 26.

The inverted U-shaped frame is maintained in vertical position, as well as braced, through the medium of a pair of oppositely extending brace members 27 having their inner ends secured to the upper portion of the side members of the frame and their outer ends to the front fenders 6. The members 27 also act as braces for the front fenders 6, and each of the members 27 has a depending inner terminal portion 28, which is secured by the holdfast devices 29 to a side member of the frame. The bracing of the device and the front fenders is had without any strain upon the radiator 4.

The device in accordance with this invention will not only guard the radiator, in case of collision, but will also act as a bracing means for the front fenders, and although the preferred embodiment of the invention, is as illustrated and described, yet it is to be understood changes in the details of construction can be had which will fall within the scope of the invention as claimed.

What I claim is:

1. A combined radiator guard and fender brace for motor vehicles comprising an inverted vertically disposed U-shaped frame, a horizontally disposed rearwardly extending yoke-shaped support formed of an intermediate and a pair of rearwardly extending end portions of a length to extend below the supports for the standards of the headlights of the vehicle, said support of greater width than said frame, means for securing the lower end of said frame to said intermediate portion, means for securing the rear terminals of said end portions to said supports, spaced bars secured to said intermediate portion and extending through the top of the frame, and brace members secured to upper end of said frame and to the front fenders of the vehicle.

2. A combined radiator guard and fender brace for motor vehicles comprising an inverted vertically disposed U-shaped frame, a horizontally disposed rearwardly extending yoke-shaped support formed of an intermediate and a pair of rearwardly extending end portions of a length to extend below the supports for the standards of the headlights of the vehicle, said support of greater width than said frame, means for securing the lower end of said frame to said intermediate portion, means for securing the rear terminals of said end portions to said supports, spaced bars secured to said intermediate portion and extending through the top of the frame, and brace members secured to upper end of said frame and to the front fenders of the vehicle, said end portions offset to position the rear part thereof above the forward part.

3. A combined radiator guard and fender brace for motor vehicles comprising a rearwardly extending horizontally disposed yoke-shaped support positioned at the lower portion of the front of the radiator and of greater width than the latter, said support comprising a front member and a pair of arms, an inverted vertically disposed U-shaped frame having its lower end seated upon said front member and formed of oppositely extending laterally disposed flanges, means for fixedly securing the flanges to said front member, said arms of a length to extend below the supports for the standards of the headlights of the vehicle, means for securing the rear terminal portions of said arms to said supports, spaced bars secured to said front member and extending through the top of the frame, and oppositely disposed brace members secured to the top of the frame and to the front fenders of the vehicle.

4. A combined radiator guard and fender brace for motor vehicles comprising a rearwardly extending horizontally disposed yoke-shaped support positioned at the lower portion of the front of the radiator and of greater width than the latter, said support comprising a front member and a pair of arms, an inverted vertically disposed U-shaped frame having its lower end seated upon said front member and formed of oppositely extending laterally disposed flanges, means for fixedly securing the flanges to said front member, said arms of a length to extend below the supports for the standards of the headlights of the vehicle, means for securing the rear terminal portions of said arms to said supports, spaced bars secured to said front member and extending through the top of the frame, and oppositely disposed brace members secured to the top of the frame and to the front fenders of the vehicle, the said rear terminal portions of the arms offset to extend above the forward terminal portions thereof.

In testimony whereof, I affix my signature hereto.

ELMER J. NEGY.